United States Patent
Liu et al.

(10) Patent No.: US 8,812,887 B2
(45) Date of Patent: Aug. 19, 2014

(54) ELECTRONIC DISPLAY DEVICE AUTOMATICALLY TURNS ON OR OFF ACCORDING TO WHETHER A USER IN FRONT OF THE DISPLAY

(75) Inventors: Xu Liu, Shanghai (CN); Chi-Ming Lu, New Taipei (TW)

(73) Assignees: Ambit Microsystems (Shanghai) Ltd., Shanghai (CN); Hon Hai Precision Industry Co., Ltd., New Taipei (TW)

( * ) Notice: Subject to any disclaimer, the term of this patent is extended or adjusted under 35 U.S.C. 154(b) by 278 days.

(21) Appl. No.: 13/305,754

(22) Filed: Nov. 29, 2011

(65) Prior Publication Data

US 2013/0132751 A1    May 23, 2013

(30) Foreign Application Priority Data

Nov. 21, 2011    (CN) .......................... 2011 1 0372847

(51) Int. Cl.
    *G06F 1/00*    (2006.01)
(52) U.S. Cl.
    USPC .............................. 713/323; 713/324; 348/94
(58) Field of Classification Search
    USPC ...................................................... 713/323
    See application file for complete search history.

(56) References Cited

U.S. PATENT DOCUMENTS

| | | | | |
|---|---|---|---|---|
| 5,918,060 A * | 6/1999 | Jeong | ............................. | 713/324 |
| 6,518,561 B1 * | 2/2003 | Miura | ........................... | 250/221 |
| 6,650,322 B2 * | 11/2003 | Dai et al. | ...................... | 345/212 |
| 7,251,350 B2 * | 7/2007 | Tsirkel et al. | ................ | 382/118 |
| 7,382,364 B2 * | 6/2008 | Sasaki | ........................... | 345/211 |
| 8,330,778 B2 * | 12/2012 | Song et al. | ..................... | 345/690 |
| 8,558,665 B2 * | 10/2013 | Um et al. | ..................... | 340/5.74 |
| 8,581,974 B2 * | 11/2013 | Lin et al. | ......................... | 348/94 |
| 2011/0135114 A1 * | 6/2011 | Oba et al. | ...................... | 381/107 |
| 2011/0273546 A1 | 11/2011 | Lin et al. | | |

FOREIGN PATENT DOCUMENTS

| | | |
|---|---|---|
| CN | 100426837 C | 10/2008 |
| JP | 05019906 A * | 1/1993 |
| JP | 2011123763 A * | 6/2011 |

* cited by examiner

*Primary Examiner* — Suresh Suryawanshi
(74) *Attorney, Agent, or Firm* — Novak Druce Connolly Bove + Quigg LLP

(57) ABSTRACT

An electronic display device detects whether a user is in front of a display via a camera according to a first frequency in a working mode of the electronic display device. If the electronic display device detects that the user is not in front of the display for a first predefined time period, the electronic display device enters a power saving mode by turning off the display. The electronic display device detects whether the user is in front of the display again via the camera according to a second frequency in the power saving mode. The electronic display device reduces the second frequency after the user is not in front of the display for a second predefined time period. The electronic display device enters the working mode by turning on the display when detecting that the user is in front of the display again.

6 Claims, 3 Drawing Sheets

ELECTRONIC DISPLAY DEVICE AUTOMATICALLY TURNS ON OR OFF ACCORDING TO WHETHER A USER IN FRONT OF THE DISPLAY

BACKGROUND

1. Technical Field

The present disclosure relates to electronic devices, and more particularly to an electronic display device and a power saving method.

2. Description of Related Art

With the development of electronic display devices, such as mobile Internet devices (MIDs), smart devices, and portable navigation devices (PNDs), the electronic display devices have smaller sizes and more functions. Accordingly, batteries of the electronic display devices must have smaller sizes. Thus, it becomes a big challenge to reduce unnecessary power consumption of the electronic display device so as to increase battery life.

Displays such as liquid crystal displays (LCDs) are components having a high usage frequency and high power consumption in the electronic display devices, so it is important for the electronic display devices to implement a power saving method regarding the displays.

BRIEF DESCRIPTION OF THE DRAWINGS

The details of the disclosure, both as to its structure and operation, can be best understood by referring to the accompanying drawings, in which like reference numbers and designations refer to like elements.

DETAILED DESCRIPTION

All of the processes described may be embodied in, and fully automated via, software code modules executed by one or more general purpose computers or processors. The code modules may be stored in any type of computer-readable medium or other storage device. Some or all of the methods may alternatively be embodied in specialized computer hardware or communication apparatus.

In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
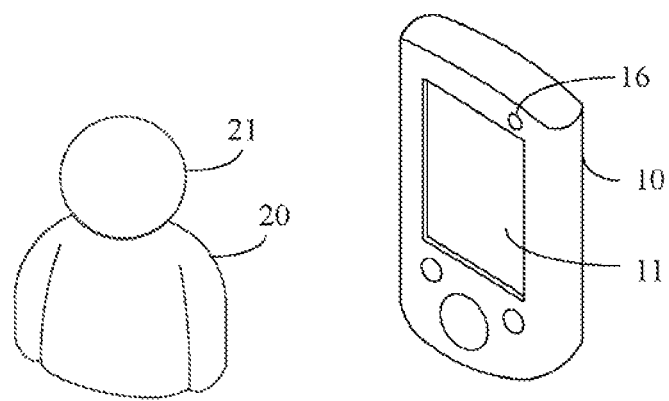
FIG. 1 is a schematic diagram of an application environment of one embodiment of an electronic display device in accordance with the present disclosure.

FIG. 1 is a schematic diagram of an application environment of one embodiment of an electronic display device 10 in accordance with the present disclosure. In one embodiment, the electronic display device 10 may be a tablet computer, a mobile Internet device (MID), a smart phone, a portable navigation device (PND), for example. The electronic display device 10 may work in a working mode or a power saving mode. The power saving mode refers to a low power mode for the electronic display device 10. The electronic display device 10 in the power saving mode consumes less power than in the working mode.

In one embodiment, the electronic display device 10 includes a display 11, such as a liquid crystal display (LCD), and a camera 16. The display 11 is operable to display working data, working content or multimedia files of a user 20. The camera 16 is positioned on the display 11 and is operable to monitor whether a face 21 of the user 20, eyes of the user 20, and other features are positioned in front of the display 11.

In one embodiment, when the user 20 enables a power saving function of the electronic display device 10 (e.g., either by a software or mechanical method), the electronic display device 10 detects whether the user 20 is in front of the display 11 via the camera 16 according to a first frequency in a working mode of the electronic display device 10. In one example, the electronic display device 10 detects whether the face 21 of the user 20 is in front of the display 11 to determine whether the user 20 is in front of the display 11. The first frequency may be two times per second. That is, the electronic display device 10 detects whether the face 21 of the user 20 is in front of the display 11 according to a frequency of two times per second.

In other embodiments, the electronic display device 10 may detect whether eyes or noses of the user 20 is in front of the display 11 to determine whether the user 20 is in front of the display 11.

If the electronic display device 10 detects that the face 21 of the user 20 is not in front of the display 11 for a first predefined time period, the electronic display device 10 turns off the display 11 so as to enter a power saving mode. In one embodiment, the user 20 may temporarily turn the face 21 around to talk with another person, or temporarily use a hand to shade the face 21. The above cases may mislead the electronic display device 10 into determining that the face 21 is not in front of the display 11. Thus, in order to avoid misleading conditions, the electronic display device 10 needs to determine that the face 21 is not in front of the display 11 for the first predefined time period and then turn off the display 11. In one example, the first predefined time period can be set according to different habits of the user 20, and may be set to ten seconds.

After entering the power saving mode, the electronic display device 10 detects whether the face 21 of the user 20 is in front of the display 11 again via the camera 16 according to a second frequency in the power saving mode. In one embodiment, the second frequency is less than the first frequency, and may be one time three seconds.

The electronic display device 10 reduces the second frequency after the face 21 of the user 20 is not in front of the display 11 for a second predefined time period. In one embodiment, the second predefined time period may be ten minutes. The electronic display device 10 may reduce the second frequency from one time three seconds to one time five seconds.

When detecting that the face 21 of the user 20 is in front of the display 11 again, the electronic display device 10 turns on the display 11 so as to enter the working mode.

In general, the electronic display device 10 automatically turns on or off the display 11 according to whether the face 21 of the user 20 is in front of the display 11, which is very conveniently and save power.

In other embodiments, the electronic display device 10 may detect whether eyes or noses of the user 20 is in front of the display 11 to determine whether the user 20 is in front of the display 11.

Figure 2:
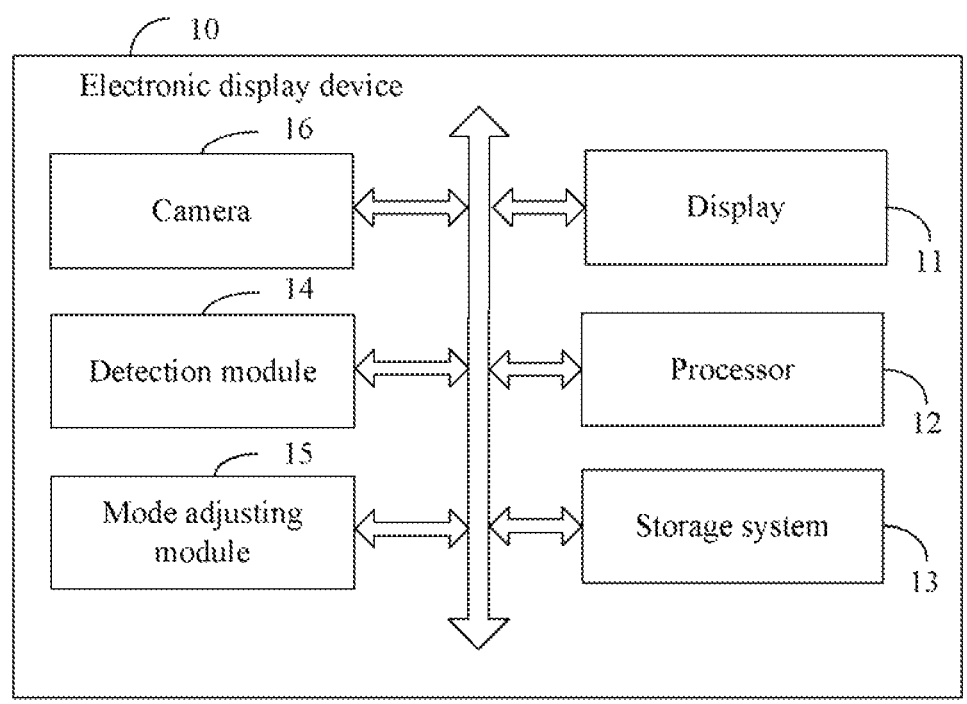
FIG. 2 is a schematic diagram of one embodiment of the electronic display device including functional modules in accordance with the present disclosure.

FIG. 2 is a schematic diagram of one embodiment of the electronic display device 10 including functional modules in accordance with the presentation disclosure. In one embodiment, the electronic display device 10 includes the display 11 (shown in FIG. 1), the camera 16 (shown in FIG. 1), at least one processor 12, a storage system 13, a detection module 14, and a mode adjusting module 15. The modules 14-15 may comprise computerized code in the form of one or more programs that are stored in the storage system 13. The computerized code includes instructions that are executed by the at least one processor 12 to provide functions for the modules 14-15. In one example, the storage system 13 may include a hard disk drive, a flash memory, a cache or another computerized memory device.

The detection module 14 is operable to detect whether the user 20 is in front of the display 11 via the camera 16 according to a first frequency in a working mode. In one embodiment, the detection module 14 detects whether the face 21 of the user 20 is in front of the display 11 to determine whether the user 20 is in front of the display 11. In one example, the first frequency may be two times per second.

In other embodiments, the detection module 14 may detect whether eyes or noses of the user 20 is in front of the display 11 to determine whether the user 20 is in front of the display 11.

The mode adjusting module 15 is operable to enter a power saving mode by turning off the display 11 when the detection module 14 detects that the user 20 is not in front of the display 11 for a first predefined time period. In one example, the first predefined time period can be set according to different habits of the user 20, and may be set to ten seconds.

The detection module 14 is further operable to detect whether the user 20 is in front of the display 11 again via the camera 16 according to a second frequency in the power saving mode. In one embodiment, the detection module 14 detects whether the face 21 of the user 20 is in front of the display 11 again to determine whether the user 20 is in front of the display 11 again. In one example, the second frequency is less than the first frequency, and may be one time three seconds.

The detection module 14 is further operable to reduce the second frequency after the user 20 is not in front of the display 11 for a second predefined time period. In one embodiment, the second predefined time period may be ten minutes. The detection module 14 may reduce the second frequency from one time three seconds to one time five seconds.

The mode adjusting module 15 is further operable to enter the working mode by turning on the display 11 when the detection module 14 detects that the user 20 is in front of the display 11 again.

Figure 3:
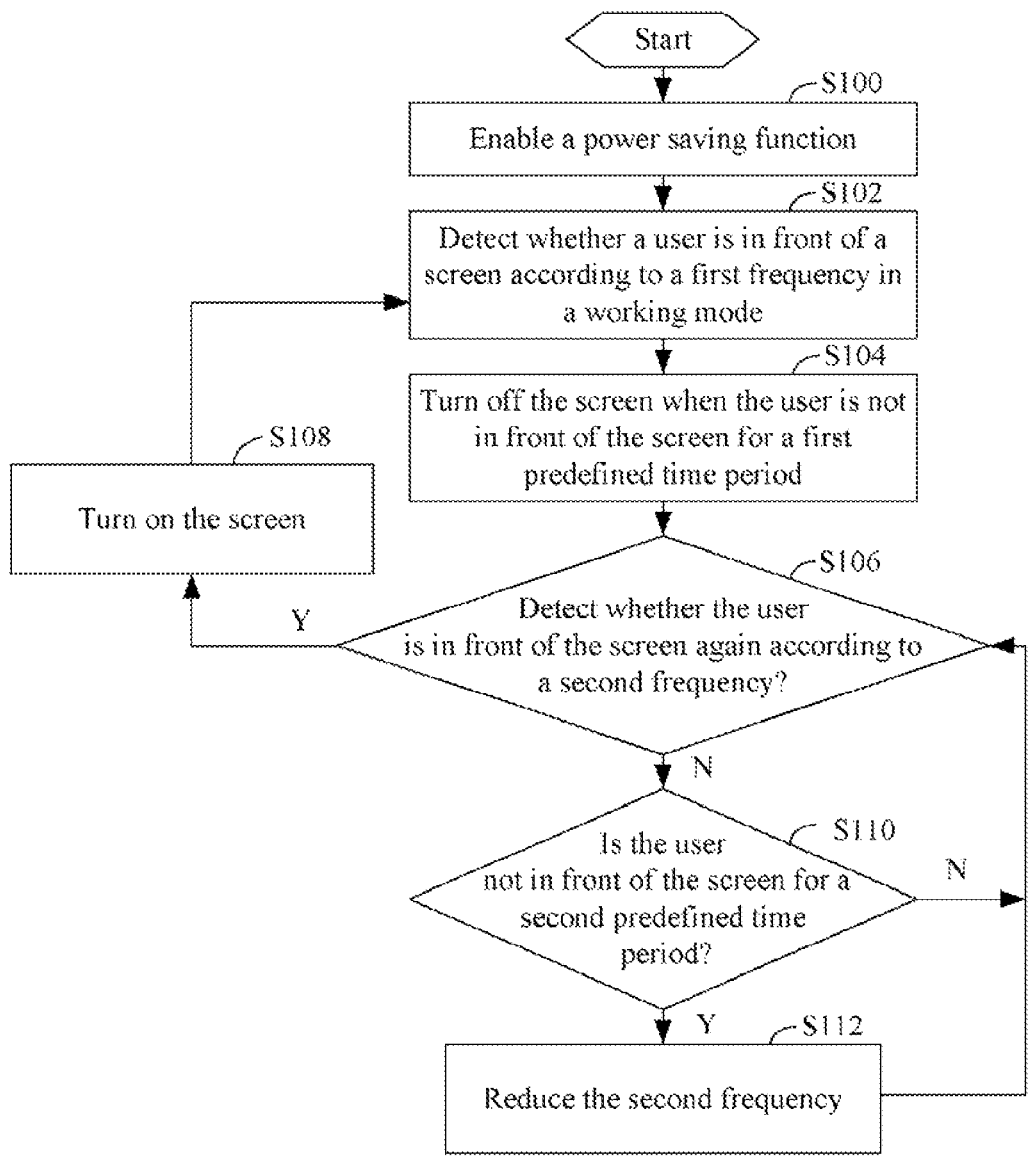
FIG. 3 is a flowchart of one embodiment of a power saving method of the electronic display device in accordance with the present disclosure.

FIG. 3 is a flowchart of one embodiment of a power saving method of the electronic display device 10 in accordance with the present disclosure. In one embodiment, the method is executed by the functional modules such as those of FIG. 2. Depending on the embodiment, additional blocks may be added, others deleted, and the ordering of the blocks may be changed while remaining well within the scope of the disclosure.

In block S100, the electronic display device 10 enables a power saving function.

In block S102, the detection module 14 detects whether the user 20 is in front of the display 11 via the camera 16 according to a first frequency in a working mode. In one embodiment, the electronic display device 10 detects whether the face 21 of the user 20 is in front of the display 11 to determine whether the user 20 is in front of the display 11. In one example, the first frequency may be two times per second.

In other embodiments, the electronic display device 10 may detect whether eyes or noses of the user 20 is in front of the display 11 to determine whether the user 20 is in front of the display 11.

In block S104, the mode adjusting module 15 turns off the display 11 so as to enter a power saving mode when the detection module 14 detects that the user 20 is not in front of the display 11 for a first predefined time period. In one example, the first predefined time period can be set according to different habits of the user 20, and may be set to ten seconds.

In block S106, the detection module 14 detects whether the user 20 is in front of the display 11 again via the camera 16 according to a second frequency in the power saving mode. In one embodiment, the detection module 14 detects whether the face 21 of the user 20 is in front of the display 11 again to determine whether the user 20 is in front of the display 11 again. In one example, the second frequency is less than the first frequency, and may be set to one time three seconds.

If the detection module 14 detects that the user 20 is in front of the display 11 again, in block S108, the mode adjusting module 15 turns on the display 11 so as to enter the working mode. Then, the flow goes back to block S102, the detection module 14 continues to detect whether the user 20 is in front of the display 11 according to the first frequency in the working mode.

If the detection module 14 detects that the user 20 is not in front of the display 11, in block S110, the detection module 14 determines whether the user 20 is not in front of the display 11 for a second predefined time period.

If the user 20 is not in front of the display 11 for the second predefined time period, the detection module 14 reduces the second frequency as shown in block S112. In one embodiment, the second predefined time period may be ten minutes. The detection module 14 may reduce the second frequency from one time three seconds to one time five seconds.

Then, the flow goes back to block S106, the detection module 14 continues to detect whether the user 20 is in front of the display 11 again according to the reduced second frequency.

The above blocks are repeated until the electronic display device 10 disables the power saving function or is powered off.

Thus, the electronic display device 10 automatically turns on or off the display 11 according to whether the user 20 is in front of the display 11, which is very conveniently and save power.

While various embodiments of the present disclosure have been described above, it should be understood that they have been presented using example and not using limitation. Thus the breadth and scope of the present disclosure should not be limited by the above-described embodiments, but should be defined in accordance with the following claims and their equivalents.

What is claimed is:

1. An electronic display device operable to work in a working mode or a power saving mode, the electronic display device comprising:
   a display operable to display working content;
   a camera positioned on the display;
   at least one processor;

a storage system to store one or more programs executable by the at least one processor, the one or more programs comprising:
- a detecting module operable to detect whether a user is in front of the display via the camera according to a first frequency in the working mode of the electronic display device; and
- a mode adjusting module operable to enter the power saving mode by turning off the display when the detecting module detects that the user is not in front of the display for a first predefined time period;
- wherein the detecting module is further operable to detect whether the user is in front of the display again via the camera according to a second frequency in the power saving mode, and further reduce the second frequency if the user is not in front of the display for a second predefined time period;
- wherein the mode adjusting module is further operable to enter the working mode by turning on the display when the detecting module detects that the user is in front of the display again.

2. The electronic display device of claim 1, wherein the second frequency is less than the first frequency.

3. The electronic display device of claim 1, wherein the detection module detects whether a face of the user is in front of the display to determine whether the user is in front of the display.

4. A power saving method of an electronic display device with a display and a camera positioned on the display, the electronic display device working in a working mode or a power saving mode, the power saving method comprising:
- detecting whether a user is in front of the display via the camera according to a first frequency in the working mode of the electronic display device; and
- entering the power saving mode by turning off the display if detecting that the user is not in front of the display for a first predefined time period;
- detecting whether the user is in front of the display again via the camera according to a second frequency in the power saving mode;
- reducing the second frequency after the user is not in front of the display for a second predefined time period; and
- entering the working mode by turning on the display when detecting that the user is in front of the display again.

5. The power saving method of claim 4, wherein the second frequency is less than the first frequency.

6. The power saving method of claim 4, wherein detecting whether the user is in front of the display comprises: detecting whether a face of the user is in front of the display to determine whether the user is in front of the display.

* * * * *